United States Patent [19]

Krumm et al.

[11] Patent Number: 5,649,155
[45] Date of Patent: Jul. 15, 1997

[54] CACHE MEMORY ACCESSED BY CONTINUATION REQUESTS

[75] Inventors: Barry Watson Krumm; Steven Tyler Comfort, both of Poughkeepsie; Jin Ji, Brewster; John Stephen Liptay, Rhinebeck; Charles Franklin Webb, Poughkeepsie; David Man Chow Wong, Poughkeepsie; Steven QiHong Ying, Poughkeepsie, all of N.Y.

[73] Assignee: International Business Machines Corporation, Armonk, N.Y.

[21] Appl. No.: 414,176

[22] Filed: Mar. 31, 1995

[51] Int. Cl.[6] .......................... G06F 12/08; G06F 12/04
[52] U.S. Cl. .......................... 395/455; 395/450; 395/417; 395/445; 395/403; 395/468
[58] Field of Search .......................... 395/464, 455, 395/450, 417, 462, 445, 468, 403

[56] References Cited

U.S. PATENT DOCUMENTS

| | | | |
|---|---|---|---|
| 4,314,331 | 2/1982 | Porter et al. | 395/460 |
| 4,332,010 | 5/1982 | Messina et al. | 395/403 |
| 4,490,782 | 12/1984 | Dixon et al. | 395/463 |
| 4,637,024 | 1/1987 | Dixon et al. | 371/67.1 |
| 4,783,736 | 11/1988 | Ziegler et al. | 395/457 |
| 4,794,521 | 12/1988 | Ziegler et al. | 395/457 |
| 4,797,814 | 1/1989 | Brenza | 395/403 |
| 4,894,770 | 1/1990 | Ward et al. | 395/455 |
| 4,905,141 | 2/1990 | Brenza | 395/456 |
| 4,953,079 | 8/1990 | Ward et al. | 395/464 |
| 4,991,090 | 2/1991 | Emma et al. | 395/185.03 |
| 5,023,776 | 6/1991 | Gregor | 395/449 |
| 5,185,879 | 2/1993 | Yamada et al. | 395/445 |
| 5,235,697 | 8/1993 | Steely et al. | 395/464 |
| 5,253,197 | 10/1993 | Suzuki et al. | 365/49 |
| 5,265,260 | 11/1993 | Hendricks | 395/800 |
| 5,339,268 | 8/1994 | Machida | 365/49 |
| 5,347,648 | 9/1994 | Stamm et al. | 395/182.03 |

OTHER PUBLICATIONS

J.S. Liptay, "Design of the IBM Enterprise System/9000 High-End Processor," Jul. 1992, IBM Journal of Research and Development, pp. 713–731.

*Primary Examiner*—Glenn Gossage
*Assistant Examiner*—Reginald G. Bragdon
*Attorney, Agent, or Firm*—Lynn L. Augspurger; Richard L. Aitken

[57] ABSTRACT

In a cache memory system, continuation registers are provided to abbreviated address data identifying the line position in the cache memory from which data is fetched. When data is fetched from a line in said cache memory, the bin number and line position identification of the line in the cache memory are saved in a continuation register. Then, subsequently, when data is fetched from the same line, it is fetched by a continuation request wherein the data saved in the continuation register is used to access the cache memory. The continuation registers provide the abbreviated address data for comparison in both PSC (program store compare) and OSC (operand store compare).

18 Claims, 3 Drawing Sheets

CACHE MEMORY ACCESSED BY CONTINUATION REQUESTS

BACKGROUND OF THE INVENTION

This invention relates to cache memories and, more particularly, to an improved system for accessing data in cache memories reducing the cycle time, and chip area required for some of the addressing hardware. The system also facilitates processing fetch instructions in parallel.

A cache memory, or cache, is a high speed memory positioned between a data processor and main storage to hold recently accessed main storage data. Whenever data in storage is accessed, it is first determined whether or not the data is in the cache and, if so, it is accessed from the cache. If the data is not in the cache, then the data is obtained from the main storage and the data is also stored in the cache usually replacing other data which had been stored in the cache memory.

The present invention is designed to be used in a data processing system, such as the IBM System/9000 High End Processor. In this data processing system, more than one data processing unit can fetch data from a cache. Since the data in the cache can be stored-to after it has been prefetched, it is necessary to determine, when storing new data in a cache, whether the same address has been previously fetched by a different data processing unit so that the different data processing unit can be notified that the fetched data may be obsolete or invalid. For this purpose, the data processing system carries out a comparison function called an operand store compare, or OSC, whenever data is stored in the cache by a data processing unit, such as a CPU. In the OSC comparison function, the store address is compared with the fetch addresses which will have been saved at the time the operands were previously fetched. In a similar manner, whenever data is stored in the cache, the system performs a comparison function called a program store compare, or PSC, in which the store address is compared with the fetch address of previously fetched instructions to determine if the instruction has been previously fetched. Because of the number of bits involved in the addresses, the comparison process can cause timing problems and also can be inaccurate.

The present invention saves time, increases the accuracy of the OSC and PSC, and reduces the area required on the integrated circuit chip for the OSC and PSC functions. In addition, the present invention facilitates fetches from the same line as previous fetches by enabling them to be carried out without accessing the look-aside buffers, such as the TLB (translation look-aside buffer) and ALB (access register translation look-aside buffer) or the cache directory and enabling fetches to be carried out in parallel.

SUMMARY OF THE PRESENT INVENTION

In accordance with the invention, when a fetch of data from a given line in the cache is executed in response to a logical address request, the cache directory along with look-aside buffers are searched along with the cache, and data is fetched from the selected double word location in the cache in the conventional manner. The search result will identify the bin in the cache (the bin number or address bits) where the line containing the DW (double word) is located and also will identify which of the four set id's (line positions) in the bin is occupied by the selected line. These search results are saved in a fetch continuation register. When a DW is again fetched from the same line, the system carries out a continuation request wherein only the bits identifying a double word in the line are transmitted to the cache memory system by the address source. At the same time, the address source also signals the continuation registers that the fetch is a continuation request and identifies which of the continuation registers has the bin number and set id for the continuation request. The bin number and set id will be read out from the continuation register and be combined with the bits identifying a selected double word in the cache to cause the readout of the desired double word from the selected line. In this manner, the searching of the directory, and the look-aside buffers for the continuation request is avoided.

In accordance with the invention, the abbreviated address data saved in the fetch continuation registers is also used in an OSC or PSC to determine whether the operand or instruction has been previously fetched thus reducing the number of bits that have to be compared in the OSC and PSC function. In addition, the fact that the invention makes use of the bin address to carry out the comparison increases the accuracy of the comparison because the bin address is equivalent to the full absolute page address consisting of bits 1 to 19 and the increased accuracy associated with a page address comparison is achieved by the system of the invention for the operand store compare and program store compare functions.

DESCRIPTION OF PREFERRED EMBODIMENTS

Figure 1:
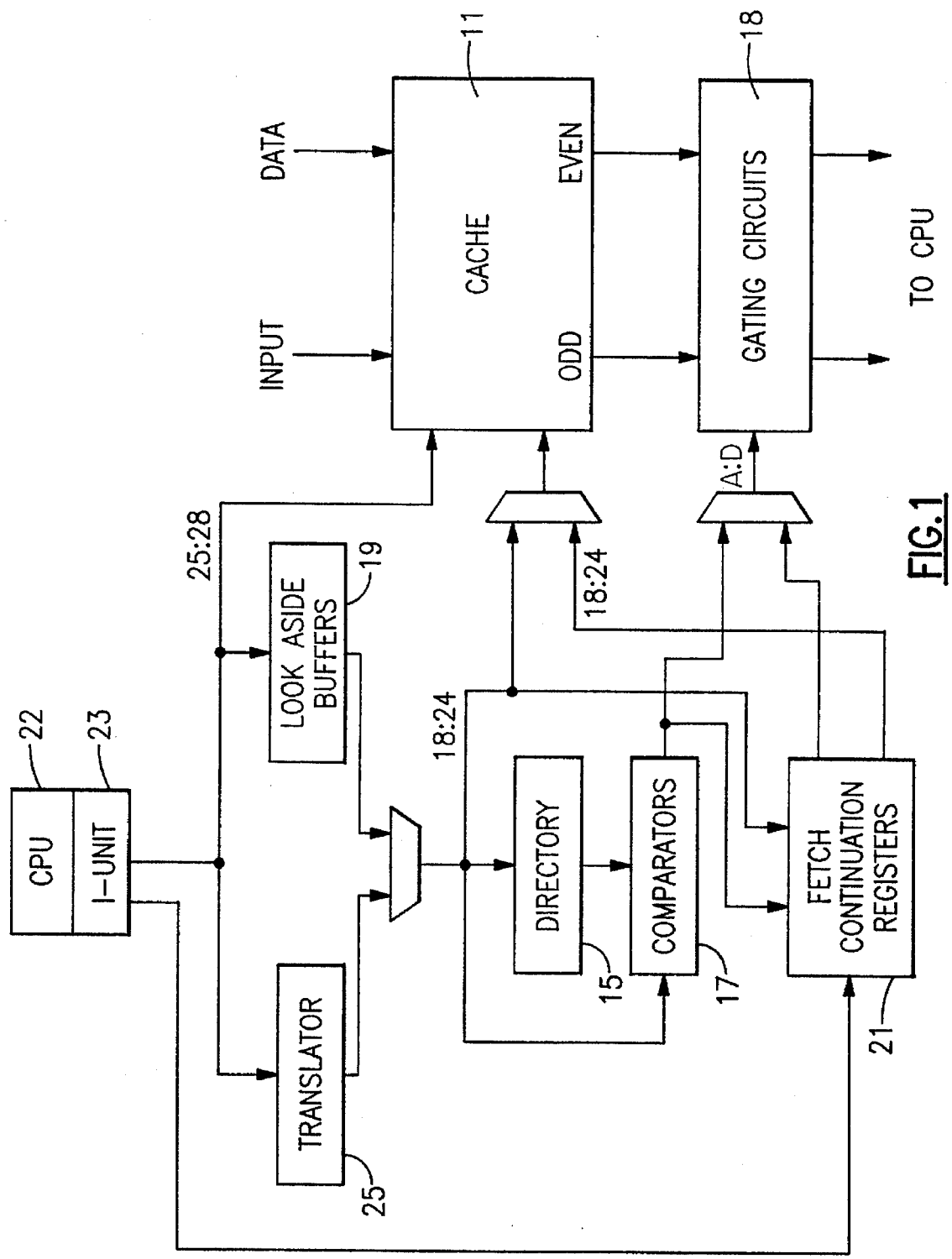
FIG. 1 is a block diagram illustrating a portion of the system of the invention showing how the system responds to continuation fetch requests.

In the system of the invention as shown in FIG. 1, the cache, which is interleaved to have odd and even portions is designated by the reference number 11. In the preferred embodiment, the cache is the closest memory to the central processor and is referred to as the L1 cache. The L1 cache is part of IBM System/9000 High-End Processor and would conventionally be used in combination with L2 caches and a central storage unit with the L2 caches being located between the central storage unit and the L1 cache. The overall system in which the present invention is incorporated is more fully described in the *IBM Journal of Research and Development*, Vol. 4, July 1992, in an article by J. S. Liptay entitled "Design of the IBM Enterprise System/9000 High-End Processor" on pages 713–731. This article is hereby incorporated by reference.

In the specific embodiment of the invention, the L1 cache 11 is divided into 128 bins each containing four lines and each line has 128 bytes. Each bin is identified by a bin number and the lines in each bin are four-way associative.

The data in the cache is accessed by a 31 bit address containing bits 1:31. This address identifies the location of the data in the central storage unit and is referred to as the absolute address. Bits 18:24 in an absolute address correspond to the bin number and when data is stored in the cache 11, data is stored in that bin of the cache which has the same bin number as the bits 18:24. The cache is provided with a directory 15, which has a word stored therein for each bin in the cache and the word is long enough to contain an entry for each line in the bin. In this specific embodiment, since the cache contains 128 bins, the directory contains 128 words each having four entries to identify four lines by their absolute address. The data stored in an entry are the absolute address bits 1:17 of a line stored in the cache along with a valid bit and four entries each containing bits 1:17 of line are stored at address locations in the directory accessed by bits 18:24 of an input address to the directory. A logical request is a request to access a line in storage such as, for example, to fetch a double word from storage. In a logical request, bits 18:24 of an input address will access the directory 15 to read out the four entries in the word selected by the bits 18:24 of the input address and compare these entries with the bits 1:17 in the input address. This comparison is made with each entry in the word of the directory accessed by the bits 18:24 in the input address. If none of the entries in the accessed word matches the bits 1:17 in the input address, this means that the cache does not contain the desired line and the data must be obtained from central storage or another cache. If one of the entries in the accessed word of the directory matches the bits 1:17 in the input address, this means that the corresponding bin in the cache contains that line from central storage.

To enable the cache to be read out in one cycle, the comparison of the addresses in the directory with the input address is carried out the same time that the cache 11 is accessed by the bin number represented by bits 18:24 in the input address and the double word identified by the input address bits 25:28 in each of the four lines in the bin identified by the input address bits 18:24 are read out to the gating circuits 18. When the comparator 17 determines that the input address bits 1:17 matches the bits 1:17 of an entry read from directory 15, the comparator 17 generates signals indicating which line in the bin corresponds to the input address. This indication is done by signals indicating position A, B, C or D for the selected line in the bin. This identification is referred to as the bin line position A:D or directory set id A:D. In response to the line position indicating signals A:D, the gating circuit 18 passes the selected double word in the line selected by the bin number, bits 18:24 to the CPU.

The 31-bit addresses of fetches are applied to the system of the invention from a CPU 22 via address source called the I-unit 23, but the addresses from the I-unit 23 are not the absolute addresses identifying the location of the data in central storage. In central storage, the data is organized by pages, each page containing 4,096 bytes of 32 lines each. In the absolute address identifying the locations of data in the central storage, the bits 1:19 of the absolute address identify the page in which the data is stored. However, the addresses provided by the I-unit will normally be different in bits 1:19 than the absolute addresses. Accordingly, the bits 1:19 in the addresses from the I-unit have to be translated to an absolute address as it is the absolute address that is used to check the directory 15 and locate the data in the cache 11. Accordingly, when the I-unit 23 inputs an address of a line which has not been accessed recently, this address goes to a translator 25 which translates the bits 1:19 of the input address to an absolute address and the absolute address represented by the bits 1:19 from the translator 25 together with the bits 20:24 of the input address from the I-unit are applied to the directory 15 to determine via the comparator 17 whether the line identified by the absolute address is in the cache 11. At the same time, as described above, bits 18:28 of the absolute address are applied to the cache 11 to read out the corresponding four double words in the four lines in the selected bin.

The translation of bits 1:19 of the logical address to the absolute page address takes several cycles of the CPU. This process would degrade the performance of the system if it were used for every storage reference. For this reason, the system employs look-aside buffers 19, known as ALB and TLB, which store the most recently performed translations by the translator 25. ALB stands for access register translation look-aside buffer and TLB stands for translation look-aside buffer. The look-aside buffers 19 are structured similarly to a cache and the address conversion is by table look-up by the right-hand address (RHS) bits and by matching the left-hand (LHS) address bits. By applying the address from I-unit 23 to the look-aside buffers 19, the look-aside buffers will produce as an output the corresponding absolute page address comprising the bits 1:19, if the absolute address is represented in the look-aside buffers 19. If the absolute address is not found in the look-aside buffers, the address from I-unit is applied to the translator 25 to translate the address from the I-unit into the absolute address and store a representation of the absolute address in the look-aside buffers. The absolute address either from the look-aside buffers 19 or from the translator 25 is then applied to the directory 15 and to the cache 11 to read out the selected word from the cache 11 as described above.

When data from a line is fetched in response to a logical address request, the look-aside buffers 19 and the directory 15 are searched as described above and if the line is found in the cache, then the bin number represented by bits 18:24 and the bin line position A:D is stored in a selected one of eight fetch continuation registers 21. The data in the cache may comprise both operands and instructions which are fetched in response to operand fetches and instruction fetches, respectively. In the specific embodiment of the invention, four of the registers are for instruction fetches and four are for operand fetches. The number of registers, and which are for instruction fetches or for operand fetches, is arbitrary. The page address bits 1:17 corresponding to the logical request are not saved in the selected fetch continuation register. When another double word in the same line is fetched, the I-unit transmits a continuation request containing only bits 25–28 of the address. A field on the I-unit interface will identify which of the continuation registers 21 saved the abbreviated address of the line in the cache consisting of only bits 18:24 and line position A:D. The I-unit applies bits 25:28 of the continuation request to the cache 11 and the bits 18:24 from the selected continuation register are also applied to the cache 11. The line position A:D from the continuation register is applied to the gating circuits 18. In this manner, the double word selected by the bits 25:28 are read out from the line selected by the bits 18:24 and the line position A:D. The continuation fetch requests are thus able to read out data from the cache without searching the look-aside buffers 19 or directory 15.

The fetch of the same line may be immediately after the original fetch or in a later fetch as long as the abbreviated address data of the line is still saved in the continuation register. Since the continuation request does not have to search the look-aside buffers and the directory, a continuation request can be processed in parallel with a logical request as long as one is for an odd double word and one is for an even double word. In addition, two continuation requests can be processed in parallel also as long as one is for an even double word and one is for an odd double word. It is also possible to service three requests in parallel if one of the group requests is a logical request that does not need data such as a store pretest, and the other two are continuation requests, one for an odd double word and the other one for an even double word.

Figure 2:
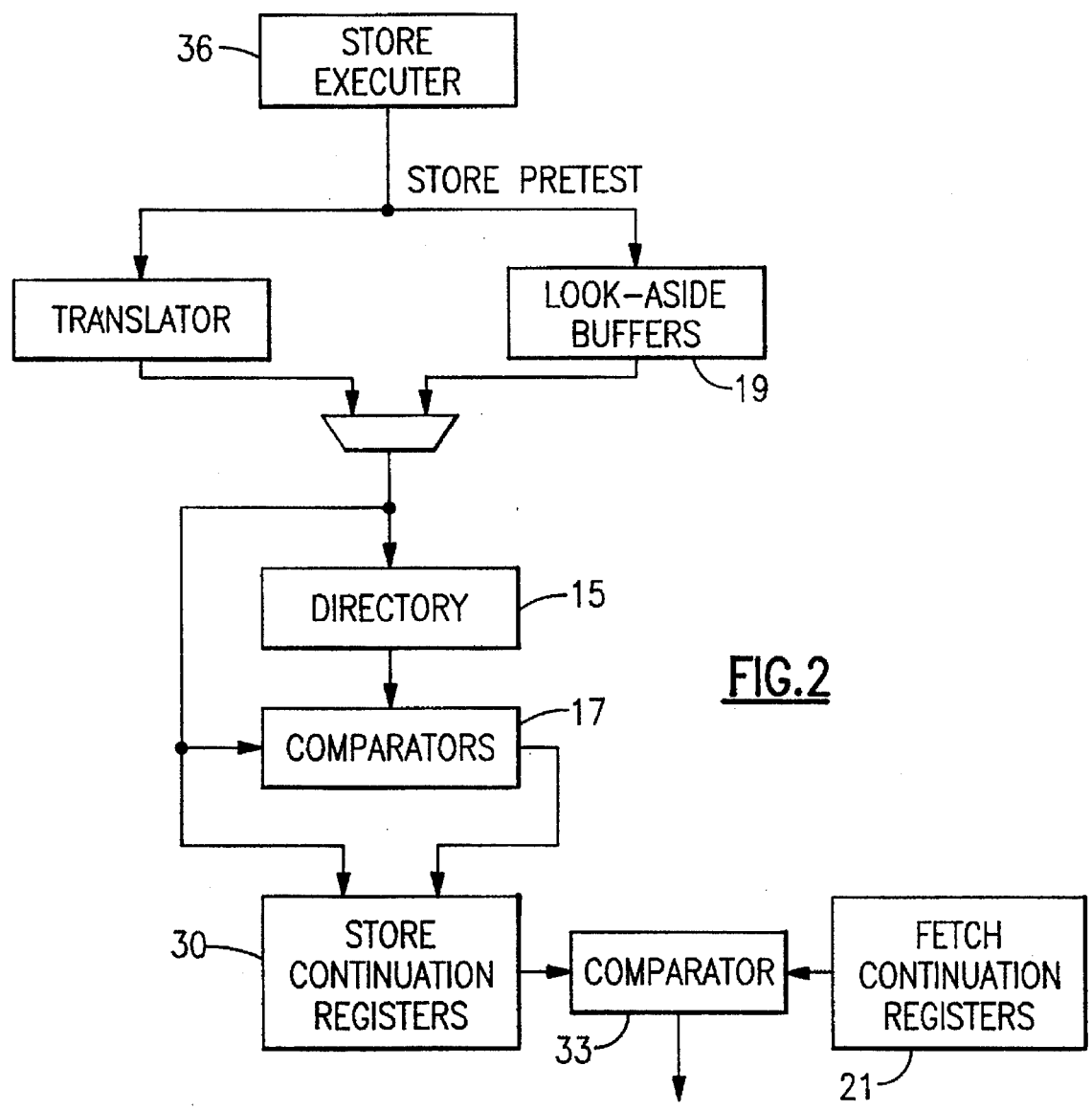
FIG. 2 is a block diagram illustrating another portion of the system showing how the operand store compare, the program store compare are effected in accordance with the present invention.

The store pretest request is the first step in processing a store command received from the CPU and the request is the same as a fetch except that it returns no data from the cache to the CPU and the search results are stored in the store continuation register 30 instead of the fetch continuation register. (See FIG. 2.) In FIG. 2, the circuitry issuing the store pretest request is represented by the store executer 36.

Prior to the present invention, the operand store compare function (OSC) was carried out by comparing the address bits 20–31 of the store address with the corresponding bits of a previous fetch address. In the program store compare function (PSC), a comparison of the full logical address was carried out. In accordance with the present invention, as shown in FIG. 2, the comparison for both OSC and PSC is carried out by a comparator 33 only between the abbreviated address bits stored in the fetch continuation register 21 and the corresponding bits in the store continuation register 30.

For a logical fetch or store pretest request, the directory 15 is searched to determine if the line is in the cache 11. If the line is not in the cache 11, the line is obtained from central storage or from another cache and the accessed line will then be written in the cache 11 in the bin corresponding to the bits 18:24 of the absolute address of the line.

Figure 3:
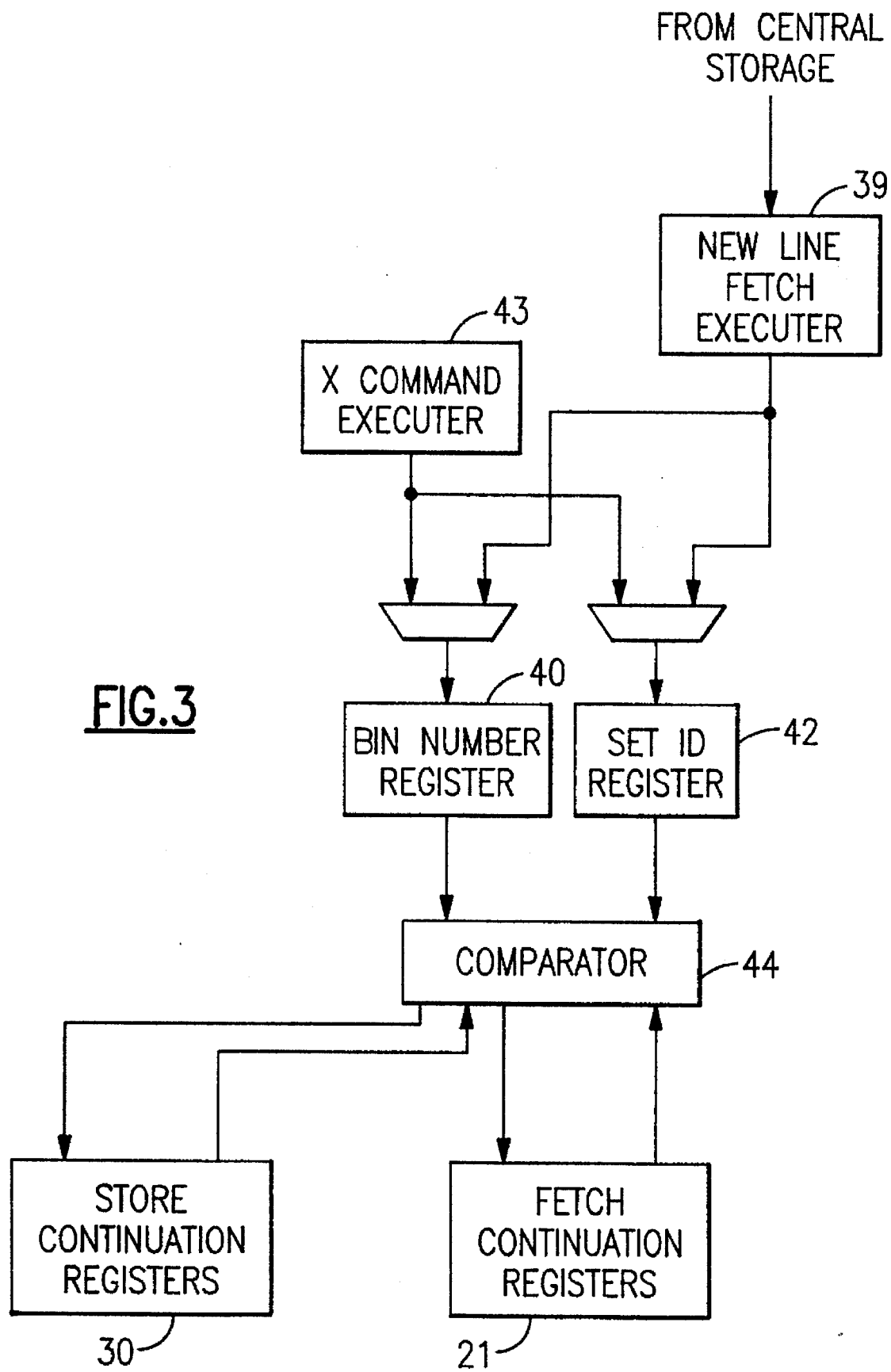
FIG. 3 is a block diagram illustrating how the system handles Xi and LRU functions.

When a new line being written in the cache 11 from central storage or from another cache, an LRU algorithm determines the line position in the cache bin identified by the bin number of the absolute address of the line. LRU stands for "least recently used" and the LRU algorithm determines which line position of a selected bin is the least recently accessed line position in the bin. As shown in FIG. 3, when a new line is written in the cache 11, a new line fetch executer 39 determines from the LRU algorithm the line position A:D of the new line being transferred into the cache and these bits A:D are stored in a set id (line position) register 42. The bin number, bits 18:24, of the new line address are stored in bin number register 40. The bin number in register 40 and the set id stored in register 42 are compared in a comparator 44 with the abbreviated address data in the fetch and store continuation registers 21 and 30 and if a match is found, the corresponding continuation register is marked invalid by reversing the state of its valid bit from valid to invalid.

When an Xi (cross-interrogate, or invalidate) command is received from the central storage or from another cache requiring cancellation of a line in the cache 11, the accompanying absolute address is applied to the directory 15 as described above to determine whether the address line identified by the address is in the cache and, if so, what its line position is as determined by the comparator 17. This circuitry is represented in FIG. 3 as the Xi command executer 43. The bin number of the Xi command will be stored in the register 40 and the line position will be stored in the register 42 to be compared by comparator 44 with the continuation registers 21 and 30. If a match is determined in response to an Xi command, comparator 44 marks the corresponding continuation register as invalid. As indicated above, there are eight fetch continuation registers. Four of these continuation registers are reserved for operand fetches and four are reserved for instruction fetches.

In the system as described above, when a previously accessed line in the cache is accessed again whereby the bin number and the bin line position in the bin is saved in the continuation register, comparison needs only to be made using the address range of the bin number and the bin line position. This feature reduces the amount of time required for the comparison to be made, reduces the amount of area required for the comparison functions and provides for more accurate comparison. For OSC, more accurate comparison is provided because the bin number and line position is equivalent to doing an absolute page and line address comparison. The bin number implies a particular absolute page address and page address comparison is more accurate than the traditional approach of comparing bits 20:31. For PSC, more accurate comparison is provided because the equivalent of an absolute page and line address comparison is carried out as opposed to a logical address comparison. Because a given logical address 1:31 can map to more than one absolute address, and more than one logical address can map to the same absolute address, absolute address comparison is more accurate than logical address comparison.

The above description is of a preferred embodiment of the invention and modification may be made thereto without departing from the spirit and scope of the invention which is described in the appended claims.

We claim:

1. A cache memory system comprising a cache memory for storing data, said cache memory being divided into bins each identified by a bin number, each bin containing a plurality of lines of data, each line of data being stored in a position in the bin identified by a line position identification, each of said lines containing a plurality of words, a directory for storing an entry identifying each of the lines of data stored in said cache memory, and access means to receive and respond to a logical request to search said directory and said cache memory, said logical request containing a fetch address for selecting a word in said cache memory if the line containing said word is in said cache memory, said access means searching said directory to determine whether or not the line of the selected word is identified in said directory and if the line of the selected word is identified in said directory to read out the selected word from said cache memory, a fetch continuation register, logical request responsive means responsive to a logical request containing an address for selecting a word determined by said access means to be in a line of data stored in said cache memory to store the bin number and the line position identification of such line of data in said fetch continuation register, and continuation request responsive means to receive a continuation request for selecting a word in a line stored in said cache memory identified by the bin number and line position identification in said fetch continuation register and responsive to the bin number and the line position identification in said fetch continuation register to read out the selected word, said continuation request responsive means reading out a selected word from the same line in said cache memory from which a selected word was read out by said access means in response to a logical request in response to which said logical request responsive means stored the bin number and line position identification of said same line in said fetch continuation register, whereby the selected word can be read from said cache memory in response to a continuation request without searching said directory.

2. A cache memory system as recited in claim 1, wherein said fetch continuation register is one of a plurality of fetch continuation registers and wherein said continuation request responsive means selects one of said fetch continuation registers and reads the selected word from the line stored in the cache memory identified by the bin number and the line position identification stored in the selected fetch continuation register.

3. A cache memory system as recited in claim 2, wherein said data in said cache memory comprises both operands which can be fetched by operand fetches and instructions which can be fetched by instruction fetches, said logical request responsive means storing the bin number and the line position identification in one of said fetch continuation registers in response to both operand fetches and instruction fetches.

4. A cache memory system as recited in claim 2, further comprising cancellation means to respond to a cancellation command having a cancellation address identifying a line in said cache memory to be canceled to cancel such line in said cache memory, a bin number register to store the bin number corresponding to said cancellation address, a line position register for storing the line position identification corresponding to said cancellation command address, said cancellation means storing the bin number of said cancellation address said bin number register and storing the line position identification of the line identified by said cancellation address in said line position register, and means to compare the bin number in said bin number register and the line position identification in said line position register with the bin number and line position identification stored in said fetch continuation registers and to invalidate the fetch continuation register containing a bin number and line position identification which matches the bin number and line position identification in said bin number register and said line position register.

5. A cache memory system as recited in claim 2, further comprising a bin number register to store a bin number, a line position register to store a line position identification, means to respond to a new line fetch command having a line address for a new line of data to be stored in said cache memory to store a bin number of the line address in said bin register and to store a line position identification in said line position register identifying the line position in said cache memory into which said new line of data is to be stored, and means to compare the bin number in said bin register and the line position identification in said line position register with the bin number and line position identification stored in said fetch continuation registers and to invalidate the fetch continuation register containing a bin number and a line position identification which matches the bin number and line position identification in said bin number register and said line position register.

6. A cache memory system as recited in claim 1, further comprising a translator for translating an input address to an absolute address identifying the location of a line in central storage, look-aside buffers storing representations of selected absolute addresses of lines, said access means searching said look-aside buffers for an absolute address corresponding to an input address of a logical request, said translator translating the input address of the logical request to the corresponding absolute address only if the absolute address is not found in said look-aside buffers, whereby a selected word can be read from said cache memory in response to a continuation request without searching said look-aside buffers.

7. A cache memory system as recited in claim 1, further comprising a store continuation register, means responsive to a store command having a store address identifying a line into which data is to be stored in said cache memory to store the bin number and the line position identification corresponding to said store address in said store continuation register, and means to compare the bin number and the line position identification in said store continuation register with the bin number and line position identification in said fetch continuation register to determine whether data from the line in said cache selected by said store command has been previously fetched.

8. A cache memory system as recited in claim 7, wherein said means to compare the bin number and line position identification in said store continuation register with the bin number and line position identification in said fetch continuation register is carried out in a program store compare function (PSC) and an operand store compare function (OSC).

9. A cache memory system comprising a cache memory for storing lines of data, a directory for storing an entry identifying each of the lines of data stored in said cache memory, and access means to receive and respond to a logical request to search said directory and said cache memory, said logical request containing a fetch address for selecting data in said cache memory if the line containing said data is in said cache memory, said access means searching said directory to determine whether or not the line of the selected data is identified in said directory and if the line of the selected data is identified in said directory to read out the selected data from said cache memory, a fetch continuation register, logical request responsive means responsive to a logical request containing an address for selecting data determined by said access means to be in a line of data stored in said cache memory to store address data identifying the position of such line of data in said fetch continuation register, and continuation request responsive means to receive a continuation request for selecting data in a line stored in said cache memory identified by the address data in said fetch continuation register and responsive to the address data in said fetch continuation register to read out the selected data, said continuation request responsive means reading out selected data from the same line in said cache memory from which selected data was read by said access means in response to a logical request in response to which said logical request responsive means stored the bin number and line position identification in said fetch continuation register, whereby the selected data can be read from said cache memory in response to a continuation request without searching said directory.

10. A cache memory system as recited in claim 9, wherein said fetch continuation register is one of a plurality of fetch continuation registers and wherein said continuation request responsive means selects one of said fetch continuation registers and reads the selected data from the line stored in the cache memory identified by the address data stored in the selected continuation register.

11. A cache memory system as recited in claim 10, wherein said data in said cache memory comprises both operands which can be fetched by operand fetches and instructions which can be fetched by instruction fetches, said logical request responsive means storing address data in one of said fetch continuation registers in response to both operand fetches and instruction fetches.

12. A cache memory system as recited in claim 10, further comprising cancellation means to respond to a cancellation command having a cancellation address identifying a line in said cache memory to be canceled to cancel such line in said cache memory, address register means to store address data identifying a line position in said cache, said cancellation means storing in said address register means address data identifying the line position of the line identified by said cancellation address, and means to compare the address data in said address register means with the address data stored in said fetch continuation registers and to invalidate the fetch continuation register containing address data which matches the address data in said address register means.

13. A cache memory system as recited in claim 10, further comprising an address register means to store address data identifying a line position in said cache memory, means to respond to a new line fetch command having a line address for a new line of data to be stored in said cache memory to store address data in said address register means identifying the line position in said cache memory into which said new line of data is to be stored, and means to compare the address data in said address register means with the address data stored in said fetch continuation registers and to invalidate the fetch continuation register containing address data which matches the address data in said address register means.

14. A cache memory system as recited in claim 9, further comprising a translator for translating an input address to an absolute address identifying the location of a line in central storage, look-aside buffers storing representations of selected absolute addresses of lines, said access means searching said look-aside buffers for an absolute address corresponding to the input address of a logical request, said translator translating the input address of the logical request to the corresponding absolute address only if the absolute address is not found in said look-aside buffers, whereby selected data can be read from said cache memory in response to a continuation request without searching said look-aside buffers.

15. A cache memory system as recited in claim 9, further comprising a store continuation register, means responsive to a store command to store address data in said store continuation register identifying the line position in said cache memory into which data is to be stored and means to compare the address data in said store continuation register with the address data in said fetch continuation register to determine whether data from the line in said cache memory selected by said store command has been previously fetched.

16. A cache memory system as recited in claim 15, wherein said means to compare the address data in said store continuation register with the address data in said fetch continuation register is carried out in a program store compare (PSC) and an operand store compare (OSC).

17. A cache memory system comprising a cache memory for storing data, said cache memory being divided into bins each identified by a bin number, each bin containing a plurality of lines of data, each line of data being stored in a position in the bin identified by a line position identification, each of said lines containing a plurality of words, a directory for storing an entry identifying each of the lines of data stored in said cache memory, and access means to receive and respond to a logical request to search said directory and said cache memory, said logical request containing an address for selecting a word in said cache memory if the line containing said word is in said cache memory, said access means searching said directory to determine whether or not the line of the selected word is identified in said directory and if the line of the selected word is identified in said directory to access the selected word, a continuation register, logical request responsive means responsive to a logical request containing an address for selecting a word determined by said access means to be in a line of data stored in said cache memory to store the bin number and the line position identification of such line of data in said continuation register, and continuation request responsive means to receive a continuation request for selecting a word in a line stored in said cache memory identified by the bin number and line position identification in said continuation register and responsive to the bin number and the line position identification in said continuation register to access the selected word, said continuation request responsive means accessing a selected word from the same line in said cache memory from which a selected word was accessed by said access means in response to a logical request in response to which said logical request responsive means stored the bin number and line position identification of said same line in said fetch continuation register, whereby the selected word can be accessed in response to a continuation request without searching said directory.

18. A cache memory system as recited in claim 17, wherein said continuation register is one of a plurality of continuation registers and wherein said continuation request responsive means selects one of said continuation registers and accesses the selected word in the line stored in the cache memory identified by the bin number and the line position identification stored in the selected continuation register.

* * * * *